United States Patent Office

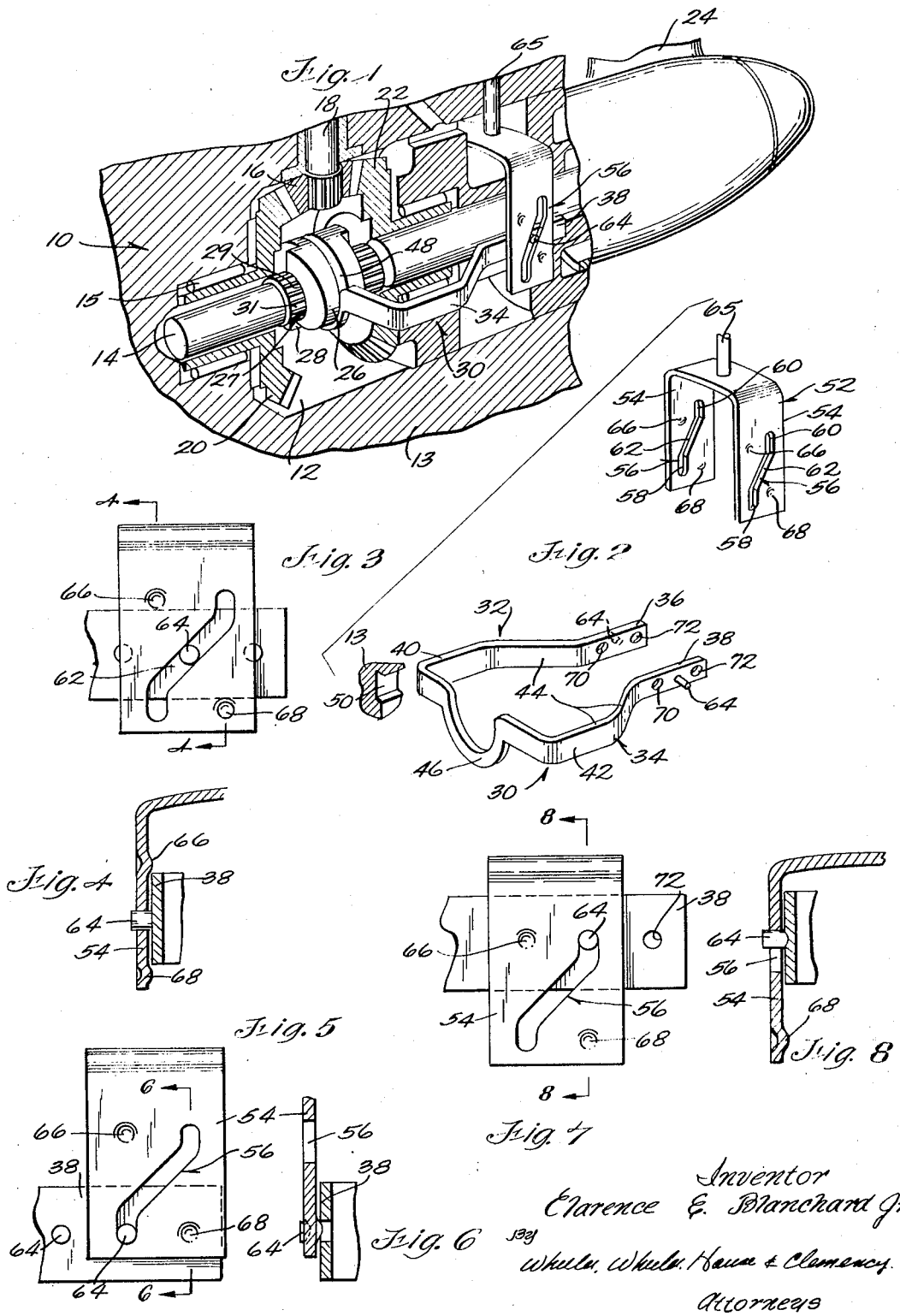

3,455,420
Patented July 15, 1969

3,455,420
POSITIVE LOCKING SHIFTING MECHANISM
Clarence E. Blanchard, Jr., Kenosha, Wis., assignor to Outboard Marine Corporation, Waukegan, Ill., a corporation of Delaware
Filed June 6, 1967, Ser. No. 643,935
Int. Cl. F16d 11/06, 21/08, 13/60
U.S. Cl. 192—51                                    13 Claims

ABSTRACT OF THE DISCLOSURE

Disclosed herein is a gear shift mechanism for movement of a clutch dog to selectively engage opposed bevel gears rotatably supported by a shaft. The shift mechanism is particularly adapted for a marine propulsion device and includes a slide connected to the clutch dog. The slide has opposed legs which are connected to a yoke which is at right angles to the slide and which has two side legs which straddle the slide legs. The yoke side legs are connected to the slide legs by posts or cam followers which are located on the slide legs and which project into cam slots in the yoke legs. The cam slots in each leg have two slot sections perpendicular to the shaft which are connected by an oblique slot section. When the cam followers are located in the perpendicular slot sections, the clutch dog is retained against axial movement. Reciprocation of the yoke manually by the operator moves the slide and clutch dog axially to engage the desired gear. Detent means are provided to secure or maintain the shift mechanism in positions of forward, neutral and reverse.

BACKGROUND OF THE INVENTION

Various problems are encountered in gear shift mechanisms for outboard marine propulsion units of the type having a clutch dog or collar which is movable axially over a propeller shaft for selective engagement with opposed bevel gears to effect forward and reverse propeller rotation. The clutch dog when worn may not fully engage the gears or may have a tendency to disengage itself from one or the other bevel gears during operation. If disengagement of the clutch dog occurs at high speed, damage to the power head or gearcase can result.

SUMMARY OF INVENTION

The gear shift mechanism of the invention positively locks a clutch dog which is movable axially along an external spline on the propeller shaft between three positions, i.e., a first position of engagement with a bevel gear for forward propeller rotation, a second position of engagement with the other bevel gear for reverse propeller rotation, and a third position of non-engagement with either of the gears affording a neutral condition with no propeller rotation. Movement of the clutch dog between forward, neutral and reverse positions is effected by a slide having two legs connected by a bridge. The slide travels parallel to the propeller shaft and rectilinearly in slide ways formed in the gearcase, the bridge connecting the opposed side legs of the slide rides in an annular groove in the clutch dog. Such engagement permits rotation of the clutch dog with the propeller shaft but also affords axial movement of the clutch dog as the slide moves rectilinearly.

Movement of the slide rectilinearly for engagement and disengagement width the gears is accomplished by a yoke having a two side legs which straddle the slide legs. The yoke is reciprocated by a shift rod, push-pull cable or the like. As the yoke is reciprocated, the slide is moved by the cooperation of cam followers or posts on the slides and cam tracks in the yoke legs. Each cam slot has two sections which are parallel to the direction of movement of the yoke and perpendicular to the propeller shaft. The perpendicular slots are connected by an obliquely or angularly extending section. When the cam followers of slide are located in the oblique sections the clutch dog is in a neutral position. Movement of the yoke toward the propeller shaft will move the cam folower and thus the slide axially of the propeller shaft and engage the clutch dog with one of the bevel gears. When the clutch dog is in engagement with one of the gears, the cam follower is located in one of the parallel cam slot sections which retains the cam follower and thus positively locks the clutch dog against unwarranted or accidental movement.

The shift mechanism is maintained in the three positions by detent means which includes projections or nibs which may be in the form of extrusions in the yoke legs which project inwardly and which engage apertures in the slide legs. When the shifting mechanism is in neutral the projections are in engagement with the edges of the side legs of the slide in a straddling position. The detent means secures the shift mechanism against accidental displacement but offers no substantial resistance to its manual operation.

Further objects and advantages of the invention will become apparent from the following description and accompanying drawings.

DRAWINGS

FIGURE 1 is a fragmentary partially broken away perspective view of a lower unit gearcase of a marine propulsion unit embodying the invention.

FIGURE 2 is a prespective view of the yoke and slide of the shifting mechanism of the invention.

FIGURE 3 is an enlarged fragmentary view showing the location of the cam follower in the cam slot when the shifting mechanism is in a neutral position.

FIGURE 4 is a sectional view along line 4—4 of FIGURE 3.

FIGURE 5 is a fragmentary enlarged view showing the location of the cam follower in the cam slot when the shifting mechanism is in a position for forward propeller rotation.

FIGURE 6 is a sectional view along line 6—6 of FIGURE 5.

FIGURE 7 is an enlarged fragmentary view showing location of the cam follower in the cam slot when the shifting mechanism is in reverse position.

FIGURE 8 is a sectional view along line 7—7 of FIGURE 7.

DESCRIPTION OF PREFERRED EMBODIMENT

In the drawings, there is shown a portion of a lower unit gearcase of a marine propulsion unit. The gearcase is designated generally 10 and has a gearcase cavity 12 defined by a wall 13 which houses a propeller shaft 14 journaled for rotation in bearing 15 and a driving gear 16 which is secured to a drive shaft 18. Also included in the cavity 12 is a pair of driven elements or gears 20 and 22 which mesh with the driving gear 16 and which are carried by and which freely rotate on the propeller shaft 14.

The direction of rotation of the propeller shaft 14 and the propeller 24 is controlled by a shiftable clutch collar or dog 26 which has lugs 28 which are selectively engageable with the gears 20, 22. The clutch dog 26 is splined to the propeller shaft 14 by splines 27 in a bore 29 of the clutch dog 26. Splines 27 receive complementary splines 31 located on the exterior of propeller shaft 14. The clutch dog 26 is axially movable over the shaft in response to actuation of the shifting mechanism as hereinafter described in detail.

In accordance with the invention, the shifting mechanism of the invention includes a first slide 30 which in the disclosed construction has opposed side legs 32, 34 with first parallel portions 36, 38 and second parallel portions 40 and 42. The first and second leg portions respectively 36, 38 and 40, 42 are connected by oblique intermediate portions 44. A slide 30 with a single side leg 32 is within the purview of the invention.

Means are provided for connecting the first slide 30 to the clutch dog 26. In the disclosed construction, the means are in the form of a bridge 46 which connects the side legs 32 and 34. The bridge 46 rides in an annular groove 48 in the clutch dog 26. Means in the form of slots or ways 50 are provided to guide the first slide 30 for rectilinear movement parallel to propeller shaft 14. The slots or ways 50 (see FIG. 3) are located in the gearcase wall 13, and receive the first parallel portions 40, 42 of the first slide 30.

The invention includes a second slide or yoke 52 which in the disclosed construction has opposed parallel depending side legs 54. In accordance with the invention, means are provided for connecting the first slide 30 to the second slide or yoke 52 to afford rectilinear movement of the first slide 30 and the clutch dog 26 upon reciprocation of the yoke 52. The means further affords positive locking of the clutch dog 26 against accidental disengagement with the bevel gears 20, 22. In the illustrated construction, such means includes cam slots in each side leg 54, the cam slots being designated generally 56 with each slot including two slot sections 58 and 60 which are parallel to the direction of movement of the yoke 52 and which are connected by an oblique section 62. Posts, pegs or cam followers 64 located on leg portions 36 and 38 of the first slide 30 ride in the cam slots. The cam followers 64 are moved axially upon movement of the cam slots and yoke 52 as hereinafter described. An alternate construction could locate the cam slots 56 in the first slide 30 and the cam followers 64 in the yoke legs.

Remote means are provided to reciprocate the yoke 52 and accordingly shift the first slide 30 fore or aft to axially move the clutch dog 26 on the propeller shaft 14. Such means can be mechanical, hydraulic or electrical. In the disclosed construction, such means are in the form of a shift rod 65 which is shown connected to the second yoke 52 for remote operation of the shift mechanism.

The shifting mechanism affords three positions of the clutch dog 26, i.e., forward, reverse and neutral, the positions being determined by the location of the cam followers in the cam slots 56 as hereinafter described in detail.

Means are provided to maintain or releasably secure the yoke 52 in three positions relative to the first slide 30 to provide forward, reverse and neutral positions of the clutch dog 26. The means provided are in the form of a detent which includes nibs or projections 66, 68 which can be extruded in the yoke side legs 54 and which project inwardly. Projections 66 and 68 engage apertures 70 and 72 in side legs 36 and 38 of the first slide 30. The detent means could be located in the gearcase wall 13, but the disclosed construction is preferred because of ease of manufacture and low cost. The detent means could utilize projections in the side legs 36 and 38 of the first slide and apertures in the yoke legs 54.

As shown in FIGURE 3, when the clutch dog 26 is in the neutral position and disengaged from either of the bevel gears 20 or 22, the cam follower is located in the center of the oblique section 62 of the cam slots. The clutch dog 26 is maintained, in the absence of an external force, in the neutral position by projections 66 and 68 on each of the side legs of the second yoke 52, which, as shown in FIGURE 3, straddle the side legs 36 and 38 of the first yoke 30. As shown in FIGURE 5, to effect propeller rotation for forward movement of a boat hull, the yoke 52 is moved away from the propeller shaft 14. Such movement causes pressure of the oblique cam slot sections 62 on the cam followers 64, thus moving the first slide 30 axially rearwardly of the propeller shaft 14 and the clutch dog 26 into engagement with gear 22. When the cam followers reach the end of the oblique section, the clutch dog 26 is in engagement with the gear 22. The cam followers are then aligned with the parallel slot sections 58, and continued movement of yoke 52 will position the cam followers in the parallel sections and secure the slide 30 against axial movement. Movement of the yoke 52 is prevented by projections 68 which, as shown in FIGURE 5, are interfitting with or in engagement with apertures 72 in the leg portions 36 and 38.

Shifting of the clutch dog 26 for engagement with the bevel gear 20 to effect reverse movement is accomplished by movement of the yoke 52 toward the propeller shaft 14 to thus afford axial movement of the clutch dog 26 forwardly as the oblique cam section urges the first slide 30 forwardly. As best shown in FIGURE 7, continued movement of the yoke 52 will locate the cam follower in the upper parallel portion of the cam track. The clutch dog 26 is maintained in the forward position in engagement with the bevel gear 20 by the projections 66 which interfit with or engage the apertures 70 in the side legs 36 and 38.

Various of the features of the invention are set forth in the following claims.

What is claimed is:

1. In a shifting mechanism for a marine propulsion device, said mechanism having a propeller shaft, a driven element carried by said propeller shaft, a clutch dog splined to and reciprocal axially of said propeller shaft, said clutch dog having lugs engageable and disengageable with said driven element, the improvement in combination therewith comprising a first slide movable axially of said propeller shaft, said axially movable first slide including integral means in direct continuous engagement with said clutch dog so as to move said clutch dog into engagement with said driven element in response to movement of said first slide to a first position, a second slide, means for connecting said first slide to said second slide to afford movement of said first slide and said clutch dog upon movement of said second slide, said means connecting said first slide to said second slide including cooperating surfaces automatically positively locking said first slide against movement and thereby locking said clutch dog against disengagement from said driven element when said first slide is in said first position, and remote means for moving said second slide.

2. A shifting mechanism in accordance with claim 1 wherein said first slide has opposed legs and said second slide comprises a yoke, said yoke having side legs transverse to and straddling said legs of said first slide.

3. A shifting mechanism in accordance with claim 2 wherein said means connecting said second slide to said first slide comprises a cam slot in each of said side legs and said first slide legs each have a cam follower extending into said cam slots on said side legs.

4. A shifting mechanism in accordance with claim 3 wherein each of said cam slots has a slot section perpendicular to the direction of movement of said clutch dog.

5. A shifting mechanism in accordance with claim 3 wherein each of said cam slots has two offset sections perpendicular to the direction of movement of said clutch dog, said perpendicular sections being connected by an oblique section.

6. A shifting mechanism in accordance with claim 2 wherein said means connecting said first slide to said clutch dog comprises an annular groove in said clutch dog and a bridge connecting said legs of said first slide, said bridge riding in said annular groove.

7. A shifting mechanism in accordance with claim 1 including means for maintaining said first slide in three positions relative to said second slide.

8. A shifting mechanism in accordance with claim 7 wherein said means for maintaining said first slide in three positions relative to said second slide comprises apertures in one of said first slide or second slide and projections in the other of said first slide or second slide, said projections releasably engaging said apertures.

9. A shifting mechanism in accordance with claim 2 including means to maintain said yoke in three positions relative to said first slide.

10. A shifting mechanism in accordance with claim 9 wherein said means to maintain said yoke in three positions relative to said first slide comprises two apertures in each of said legs of said first slide and two projections in each of said side legs of said yoke, said apertures and said projections being located in said respective legs whereby one projection in each of said yoke side legs is in engagement with one aperture in each of said legs of said slide to releasably secure said yoke to the slide in a first position, and the other of said projections and said apertures is in engagement to releasably secure said yoke to said slide in a second position and both of said projections on each of said legs of said first slide are in a straddling position with said legs of said first slide to releasably secure said yoke to said slide in a third position.

11. A shifting mechanism in accordance with claim 1 wherein said first slide comprises two side legs having first parallel portions and second parallel portions, said second parallel portions being offset from said first parallel portion, said second parallel portions being connected by a bridge, and means to guide said second parallel portions for rectilinear movement.

12. A shifting mechanism in accordance with claim 11 wherein said means to guide said first slide comprises a lower unit gearcase having a wall defining a gearcase cavity, said wall having slots, said slots being parallel to said propeller shaft and said second parallel portions of said first slide being located in said slots in said gearcase.

13. A shifting mechanism in accordance with claim 1 in combination with a lower unit gearcase.

References Cited

UNITED STATES PATENTS

| | | | |
|---|---|---|---|
| 1,092,639 | 4/1914 | Flinchbaugh | 192—93 XR |
| 2,435,536 | 2/1948 | Ferris | 192—93 XR |
| 2,737,273 | 3/1956 | Pepper | 192—93 XR |
| 2,845,807 | 8/1958 | Harless | 192—51 XR |
| 3,119,277 | 1/1964 | Ziegler | 192—93 XR |
| 3,312,318 | 4/1967 | Ryan | 192—51 XR |

BENJAMIN W. WYCHE III, Primary Examiner

L. J. PAYNE, Assistant Examiner

U.S. Cl. X.R.

192—48.91, 93, 114